(12) United States Patent
Holtcamp

(10) Patent No.: US 9,382,354 B2
(45) Date of Patent: Jul. 5, 2016

(54) POLYESTERS CONTAINING POLYOLEFIN ARMS

(71) Applicant: ExxonMobil Chemical Patents Inc., Baytown, TX (US)

(72) Inventor: Matthew W. Holtcamp, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/518,174

(22) Filed: Oct. 20, 2014

(65) Prior Publication Data

US 2015/0148494 A1    May 28, 2015

Related U.S. Application Data

(60) Provisional application No. 61/907,471, filed on Nov. 22, 2013.

(51) Int. Cl.
| | |
|---|---|
| C08F 32/04 | (2006.01) |
| C08F 110/06 | (2006.01) |
| C08G 61/08 | (2006.01) |
| C08L 65/00 | (2006.01) |
| C08G 63/42 | (2006.01) |
| C08G 63/54 | (2006.01) |

(52) U.S. Cl.
CPC ............... *C08F 32/04* (2013.01); *C08F 110/06* (2013.01); *C08G 61/08* (2013.01); *C08G 63/42* (2013.01); *C08G 63/54* (2013.01); *C08L 65/00* (2013.01); *C08G 2261/1426* (2013.01); *C08G 2261/3324* (2013.01); *C08G 2261/3342* (2013.01); *C08G 2261/418* (2013.01); *C08G 2261/75* (2013.01)

(58) Field of Classification Search
None
See application file for complete search history.

(56) References Cited

U.S. PATENT DOCUMENTS

| | | | | |
|---|---|---|---|---|
| 3,579,487 A | * | 5/1971 | Hazen | ............................ 525/285 |
| 3,717,557 A | * | 2/1973 | Peterson et al. | ............. 522/122 |
| 4,988,764 A | | 1/1991 | Nishio et al. | |
| 6,225,432 B1 | | 5/2001 | Weng et al. | |
| 6,803,429 B2 | | 10/2004 | Morgan et al. | |
| 2005/0261451 A1 | | 11/2005 | Ung et al. | |
| 2007/0185343 A1 | | 8/2007 | Verpoort et al. | |
| 2008/0064891 A1 | | 3/2008 | Lee | |
| 2009/0318644 A1 | | 12/2009 | Brant et al. | |
| 2009/0318646 A1 | | 12/2009 | Brant et al. | |
| 2009/0318647 A1 | | 12/2009 | Hagadorn et al. | |
| 2013/0137829 A1 | * | 5/2013 | Holtcamp et al. | ............ 525/245 |

FOREIGN PATENT DOCUMENTS

| | | |
|---|---|---|
| EP | 1 693 357 | 8/2006 |
| WO | WO 98/40373 | 9/1998 |

OTHER PUBLICATIONS

Robert, Carine et al., "Tandem Synthesis of alternating polyesters from renewable resources," Nature Communications, 2011, vol. 2, Article No. 586.
Nejad, Elham Bosseini et al., "Semi-aromatic polyesters by alternating ring-opening copolymerization of styrene oxide and anhydrides", Polymer Chemistry, 2012, vol. 3, No. 5, pp. 1308-1313.
Amin et al., "*Versatile Pathways for In Situ Polyolefin Functionalization with Heteroatoms: Catalytic Chain Transfer*," Angewandte Chemie Internatoinal Ed., 2006, vol. 47, pp. 2006-2025
Chung, T. C., "Synthesis of Functional Polyolefin Copolymers with Graft and Block Structures," Progress In Polymer Science, 2002, vol. 27, Issue 1, pp. 39-85.
Lopez et al., "Synthesis of Well-Deifned Polymer Architectures by Successive Catalytic Olefin Polymerization and Living Controlled Polymerization Reactions," Progress In Polymer Science, 2007, vol. 32, Issue 4, pp. 419-454.
Mathes et al., "Cross Metathesis Functionalzation fo Polyolefins," Chemical Communications, 2004, pp. 422-423.
Rosch et al., "Polymers from Renewable Resources: Polyester Resins and Blends Based Upon Anhydride-Cured Expoxidized Soybean Oil," Polymer Bulletin 31(1993), December, No. 6, Berlin, DE, pp. 679-685.
U.S. Appl. No. 12/143,663, filed Jun. 20, 2008, Brant et al.
U.S. Appl. No. 12/487,739, filed Jun. 19, 2009, Brant et al.
U.S. Appl. No. 12/488,093, filed Jun. 19, 2009, Hagadorn et al.
U.S. Appl. No. 61/896,965, filed Oct. 29, 2013, Holtcamp et al.

* cited by examiner

*Primary Examiner* — Robert C Boyle

(57) ABSTRACT

This invention relates to a polymer product of an anhydride functionalized polymer with a cyclic epoxide, and processes for the production thereof.

27 Claims, No Drawings

POLYESTERS CONTAINING POLYOLEFIN ARMS

PRIORITY CLAIM

This invention claims priority to and the benefit of U.S. Ser. No. 61/907,471, filed Nov. 22, 2013.

FIELD OF THE INVENTION

This invention is directed toward functionalization of polymers, particularly anhydride containing polymers.

BACKGROUND OF THE INVENTION

Functionalization of polymers is often desirable to meet a particular manufacturing need. For example, polymers may be functionalized to improve toughness, enhance the acceptance of flame retardants, mineral stiffeners, glass or wood fibers, or other desired ingredients. Polymers may also be modified to help them combine more usefully or deliver higher value when recycled. Modifications can improve wetting, aid mix dispersion, filler adhesion, melt processing, surface-to-surface attraction, and other performance features. Such polymers are of interest for use in a broad range of applications as lubricants, compatibilizers, tie-layer modifiers, surfactants, and surface modifiers, among other things.

Methods for the production of polyolefins with end-functionalized groups are, however, typically multi-step processes that often create unwanted by-products and waste reactants and energy. However, metathesis has been used to functionalize polyolefins in a single step with some success.

Metathesis is generally thought of as the interchange of radicals between two compounds during a chemical reaction. There are several varieties of metathesis reactions, such as ring opening metathesis, acyclic diene metathesis, ring closing metathesis, and cross metathesis. For example, R. T. Mathers and G. W. Coates, Chem. Commun., 2004, pp. 422-423 disclose examples of using cross-metathesis to functionalize polyolefins containing pendant vinyl groups to form polar-functionalized products with a graft-type structure.

Additionally, some reviews of methods to form end-functionalized polyolefins are: (a) S. B. Amin and T. J. Marks, Angew. Chem. Int. Ed., 2008, 47, pp. 2006-2025; (b) T. C. Chung, Prog. Polym. Sci., 2002, 27, pp. 39-85; and (c) R. G. Lopez, F. D'Agosto, C. Boisson, Prog. Polym. Sci., 2007, 32, pp. 419-454. Even further, U.S. Ser. No. 12/488,093, filed Jun. 19, 2009, discloses end functionalized polyolefins prepared from vinyl terminated polyolefins by cross-metathesis.

A variation on ring-opening metathesis polymerization, which has to date been the subject of only limited research, is ring-open cross metathesis (ROCM). ROCM involves a tandem sequence in which a cycloolefin is opened and a second, acyclic olefin is then crossed onto the newly formed termini. For example, U.S. Pat. No. 6,803,429 discloses that certain Group 8 metal alkylidene complexes substituted with N-heterocyclic carbine ligands catalyze the ring-opening cross-metathesis of cycloolefins with acyclic olefinic reactants, particularly α,β-unsaturated carbonyl compounds. The ROCM products are said to be mainly monomeric, dimeric, or oligomeric species, rather than polymers.

Likewise, U.S. 2008/0064891 discloses ROCM reaction of cyclic olefins with seed oils and the like comprising contacting: (a) at least one olefinic substrate selected from (i) an unsaturated fatty acid, (ii) an unsaturated fatty alcohol, (iii) an esterification product of an unsaturated fatty acid with an alcohol, and (iv) an esterification product of a saturated fatty acid with an unsaturated alcohol; with (b) at least one cyclic olefin as a cross-metathesis partner; in the presence of (c) a ruthenium alkylidene olefin metathesis catalyst; and (d) under conditions effective to allow ring insertion cross-metathesis whereby the cyclic olefin is simultaneously opened and inserted into the olefinic substrate.

Further, WO 98/40373 discloses ROCM on solid supports to isolate the olefin immobilized on the resin, preventing unwanted olefin polymerization.

Additional references of interest include: U.S. Pat. Nos. 4,988,764; 6,225,432; EP 1 693 357; U.S. Ser. No. 12/487,739 and U.S. Ser. No. 12/143,663; U.S. Ser. No. 61/896,965; and Rosch J et al: "Polymers from Renewable Resources: Polyster Resins and Blends Based upon Anhydride-cured Epoxidized Soybean Oil", vol. 31, no. 6, Dec. 1, 1993, pp. 679-685, XP000412408.

In summary, there is a need to develop a means to provide functionalized polyolefins by straightforward reactions, particularly reactions with good conversion, preferably under mild reaction conditions with a minimal number of steps.

SUMMARY OF THE INVENTION

This invention relates to the reaction product of a:

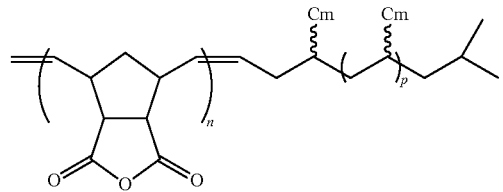

wherein "n" is an integer from 1 to 10,000;
each $C_m$ is a $C_1$ to $C_{40}$ olefin derived unit;
"m" is an integer from 1 to 39;
"p" is an integer greater than 1; and
a $C_2$ to a $C_{10}$ carbon cyclic epoxide.

The $C_m$ groups may be syndiotactic, isotactic, or atactic, specifically the group(s) represented by the formula:

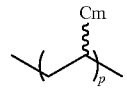

may be syndiotactic, isotactic, or atactic.

This invention also relates to a process to produce the polymers described above.

This invention also relates to compositions comprising the polymers described above.

DETAILED DESCRIPTION

Various terms as used herein are defined below. To the extent a term used in a claim is not defined below, it should be given the broadest definition persons in the pertinent art have given that term as reflected in at least one printed publication or issued patent.

For the purposes of this invention and the claims thereto, the new numbering scheme for the Periodic Table Groups is used as described in Chemical and Engineering News, 63(5), p. 27 (1985). Therefore, a "Group 4 metal" is an element from Group 4 of the Periodic Table, e.g., Hf, Zr and Ti.

"Polyolefin" means an oligomer or polymer of two or more olefin mer units and specifically includes oligomers and polymers as defined below. An "olefin," alternatively referred to as "alkene," is a linear, branched, or cyclic compound of carbon and hydrogen having at least one double bond. A "monoolefin" has one double bond, for example, an alpha, omega, pendant, or internal double bond.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like.

An oligomer is typically a polymer having a low molecular weight (such as an Mn of less than 25,000 g/mol, preferably less than 2,500 g/mol) or a low number of mer units (such as 75 mer units or less, typically 50 mer units or less, even 20 mer units or less, even 10 mer units or less).

The term "continuous" means a system that operates without interruption or cessation. For example, a continuous process to produce a polymer would be one where the reactants are continually introduced into one or more reactors and polymer product is continually withdrawn.

As used herein, Mn is number average molecular weight, Mw is weight average molecular weight, Mz is z average molecular weight, wt % is weight percent, mol % is mole percent, and vol % is volume %. Molecular weight distribution (MWD), also referred to as polydispersity (PDI), is defined to be Mw divided by Mn. Unless otherwise noted, all molecular weights (e.g., Mw, Mn, Mz) are g/mol and are determined by GPC-DRI as described in the Test Method section below.

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, THF or thf is tetrahydrofuran, MAO is methylalumoxane, OTf is trifluoromethanesulfonate, and Ac is acetyl.

Room temperature (RT) is 23° C. unless otherwise indicated.

The term "substituted" means that a hydrogen group has been replaced with a hydrocarbyl group, a heteroatom or a heteroatom containing group, except as refers to a substituted hydrocarbyl, which is defined below. For example, methyl cyclopentadiene is a cyclopentadiene (Cp) group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise the terms "group" and "substituent" are also used interchangeably in this document. For purposes of this invention, "hydrocarbyl radical" is defined to be C1 to C20 radicals, that may be linear, branched, or cyclic (aromatic or non-aromatic); and include substituted hydrocarbyl radicals as defined below.

Substituted hydrocarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)2-, —Ge(R*)2-, —Sn(R*)2-, —Pb(R*)2- and the like, where R* is independently a hydrocarbyl or halocarbyl radical, and two or more R* may join together to form a substituted or unsubstituted saturated, partially unsaturated or aromatic cyclic or polycyclic ring structure.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$ and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)2-, —Ge(R*)2-, —Sn(R*)2-, —Pb(R*)2- and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

When catalysts are described as comprising neutral stable forms of the components, it is well understood by one of ordinary skill in the art, that the ionic form of the component is the form that reacts with the monomers to produce polymers. In the description herein, the transition metal compound used for catalysis may be described as a catalyst precursor, a pre-catalyst compound, a catalyst, or a catalyst compound, and these terms are used interchangeably.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

This invention relates to a new class of functionalized polymers and processes to produce them. These polymers are the reaction product(s) from anhydride functionalized polymers and epoxides to form polyesters. This ability to add further functionality post-polymerization of the starting polymer (the anhydride functionalized polymer) affords appreciable synthetic flexibility that may be of tremendous commercial utility. For instance, bulk polymer properties such as viscosity may be tailored by utilizing this synthetic handle to increase the size and viscosity of the polymer. These functionalized polymers and processes to produce them are discussed further below.

Polyesters

This invention relates to polyesters represented by the formula:

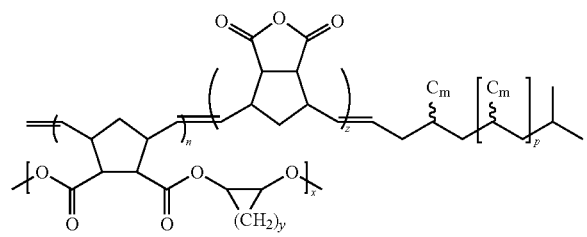

wherein "n" is an integer from 1 to 10,000;
"z" is an integer from 0 to 10,000;
Cm is a $C_1$ to $C_{40}$ olefin derived unit;
"m" is an integer from 1 to 39;
"p" is an integer greater than 1;
"y" is 0 to 10; and
"x" is from 2 to about 1,000,000.

The Cm groups may be syndiotactic, isotactic, or atactic, specifically the group(s) represented by the formula:

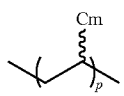

may be syndiotactic, isotactic, or atactic. In one aspect, n is an integer from 1 to 50.

In another aspect, Cm is from a C4 to C11.
In still another aspect, p is from 1 to 10,000.
In still yet another aspect, y is from 4 to 7.
In a preferred embodiment of the invention:
n is an integer from 1 to 10,000 (preferably from 1 to 5,000, from 1 to 2,500, from 1 to 1,000, from 1 to 500, or from 1 to 50);
Cm is a C1 to C40 olefin derived unit (preferably Cm is a C3 to C40 olefin derived, preferably Cm is one or more units derived from methylene, ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof);
m is an integer from 1 to 39 (preferably from 2 to 39, preferably from 2 to 29, preferably from 3 to 19, preferably from 4 to 11);
p is an integer greater than 1 (preferably from 1 to 10,000, from 1 to 5,000, from 1 to 2,500, from 1 to 1,000, from 1 to 500, or from 1 to 50);
z is an integer from 0 to 10,000 (preferably from 1 to 10,000, from 1 to 5,000, from 1 to 2,500, from 1 to 1,000, from 1 to 500, or from 1 to 50);
x is an integer from 2 to 1,000,000 (preferably from 2 to 500,000, from 5 to 250,000, from 10 to 200,00, from 15 to 100,000, from 20 to 50,000, or from 50 to 1,000); and
y is 0 to 10 (preferably from 1 to 9, from 2 to 8, from 3 to 7, from 4 to 7).

In another aspect, the Mw of the polyester is from about 1,000 to about 8,000,000 g/mol (preferably from 10,000 to 5,000,000, from 50,000 to 2,500,000 from 100,000 to 2,000,000, or from 500,000 to 1,000,000 g/mol).

Note that the Cm groups may be syndiotactic, highly syndiotactic isotactic, highly isotactic or atactic. As used herein, "isotactic" is defined as having at least 10% isotactic pentads according to analysis by 13C-NMR. As used herein, "highly isotactic" is defined as having at least 60% isotactic pentads according to analysis by 13C-NMR. As used herein, "syndiotactic" is defined as having at least 10% syndiotactic pentads according to analysis by 13C-NMR. As used herein, "highly syndiotactic" is defined as having at least 60% syndiotactic pentads according to analysis by 13C-NMR. As used herein, atactic is defined to be less than 10% isotactic or syndiotactic pentads.

13C-NMR Spectroscopy

Polymer microstructure is determined by 13C-NMR spectroscopy, including the concentration of isotactic and syndiotactic diads ([m] and [r]), triads ([mm] and [rr]), and pentads ([mmmm] and [rrrr]). Samples are dissolved in d2-1,1,2,2-tetrachloroethane. Spectra are recorded at 125° C. using a NMR spectrometer of 400 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, 13C-NMR Method", Academic Press, New York, 1977. The percent of methylene sequences of two in length, % (CH2)2, are calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments are based on H. N. Cheng and J. A. Ewen, Makromol. Chem. 1989, 190, 1931.

It should be understood that all combinations of these aspects are possible and are envisioned as part of the embodiments described herein.

The polyester is the reaction product of a functionalized polymer having an anhydride group with an epoxide (e.g., a C2 to C10 epoxide) in the presence of a catalyst, such as a M(III)salen catalyst. These components will be discussed below.

Functionalized Polymers with Anhydride Functionality

Suitable polymers functionalized with anhydride moieties are described in U.S. Ser. No. 13/306,263, filed Nov. 29, 2011, and as US Patent Publication 2013/0137829, which published on May 30, 2013, the contents of which are incorporated herein in their entirety for all purposes.

For example, in some embodiments, the polymer functionalized with anhydride moieties is represented by formula (D):

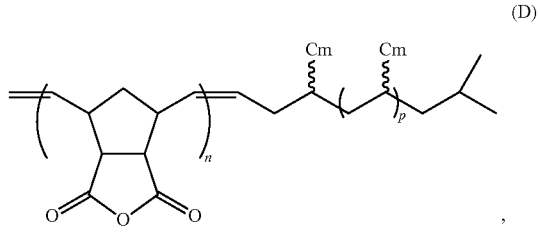

wherein n is an integer from 1 to 10,000 (preferably from 1 to 5,000, from 1 to 2,500, from 1 to 1,000, from 1 to 500, or from 1 to 50); Cm is a $C_1$ to $C_{40}$ olefin derived unit (preferably a $C_3$ to $C_{40}$ olefin derived unit, preferably Cm is one or more derived units of methylene, ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof); m is an integer from 1 to 39 (preferably from 2 to 39, preferably from 2 to 29, preferably from 3 to 19, preferably from 4 to 11); and p is an integer greater than 1 (preferably from 1 to 10,000, from 1 to 5,000, from 1 to 2,500, from 1 to 1,000, from 1 to 500, or from 1 to 50).

In some embodiments of this invention, the polymer is hydrogenated. The polymers produced herein may be hydrogenated by contacting the polymer with hydrogen and a hydrogenation catalyst. This hydrogenation step is often used to reduce the bromine number (preferably below 2.0, preferably below 1.8). Bromine number is determined by ASTM D 1159. In a preferred embodiment, the bromine number of the hydrogenated polymer decreases by at least 50% (preferably at least 75%) as compared to the starting polymer.

Cyclic Epoxides

The polyesters described herein are prepared by the reaction between the anhydride portion of the polymers described herein and an epoxide. Suitable epoxides include those C2 to C10 carbon cyclic epoxides such as ethylene oxide, propylene oxide, butylene oxide, cyclopentene oxide, cyclohexene oxide, cycloheptene oxide and the like.

Catalysts

The polyesters described herein are prepared by the reaction between an anhydride and an epoxide in the presence of a catalyst. Suitable catalysts include, for example, M(III) salen compounds, Mg(OEt)2, Zn3 [Co(CN)6]2, β-diiminate ZnOAc, or aluminum porphyrin complexes.

M(III)salen compounds include:

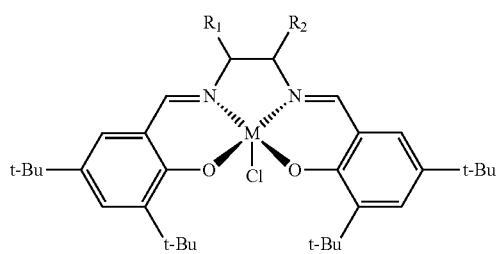

wherein M is Al, Cr or Co; and

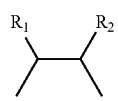

is

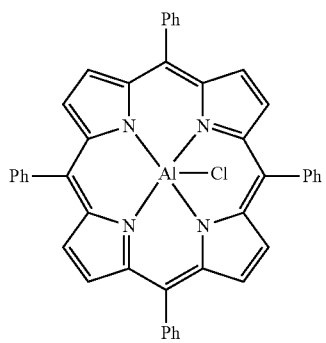

These catalysts are described in D. J. Darensbourg, et al., Macromolecules, 2012, 45, pp. 2242-2248; E. H. Nejad, et al., Macromolecules, 2012, 45, pp. 1770-1776; and A. M. DiCiccio, J. Am. Chem. Soc. 2011, 133, pp. 10724-10727, the contents of each are incorporated herein in their entirety for all purposes.

Aluminum porphyrin complexes include, for example,

See also A. M. DiDiccio, J. Am Chem. Soc. 2011, 133, pp. 10724-10727, as noted above.

The catalyst can further be combined with (bistriphenylphosphine)iminium chloride or (4-N,N-dimethylamino-pyridine) and ammonium salts.

Processes to Produce Polyesters

As noted above, an anhydride containing polymer is reacted with an epoxide in the presence of a catalyst to produce the novel esters. The reactions are generally performed with an aprotic solvent, such as hexanes, pentanes, toluene, benzene, xylenes or combinations thereof. The solvent can then later be removed from the reaction mixture by distillation or other suitable methods. Alternatively, the reaction can be run without solvent to minimize the need to remove liquids.

Purification of the polyester can be by distillation, crystallization, gel filtration and in particular by precipitation with methanol.

Typical ratios of anhydride to epoxide to catalyst range are from about 100,000:100,000:1, more particularly 200:200:1, or 395:395:1.

The reaction can further include an activator. The ratio of catalyst to activator is from about 1:100, more particularly from about 1:1 on a molar basis, e.g., 1:2. Suitable activators include (bistriphenylphosphine)iminium chloride or (4-N,N-dimethylamino-pyridine) and ammonium salts.

Generally, the ratio of epoxide to anhydride is about 1:1 to 100:1 or more (on a molar basis) and more particularly about 10:1 more preferably 1:1. The epoxide can be excess but a preference is closer to 1:1.

Typically the mixture of reaction components is heated to a temperature between about 40° C. to about 200° C., more particularly from about 80° C. to about 150° C. and in particular from about 100° C. to about 125° C.

Uses of Polymer

The polyesters described herein can be useful as lubricants, plastomers or films. Compositions comprising the polyesters produced herein are also disclosed. In such embodiments, the composition is a lubricant or lubricant base stock, an adhesive, a viscosity modifier, or a fuel additive.

In another embodiment, a novel lubricant comprises the polymers produced in this invention, alone or together with one or more other base stocks, including Group I to Group V base stocks with kinematic viscosity (ASTM D445) range from 1.5 cSt to 100 cSt at 100° C. to formulate suitable viscosity grades. In addition, additives of one or more of: thickeners, viscosity index improvers, antioxidants, anti-wear additives, detergent/dispersant/inhibitor packages, and/or anti-rust additives may be added. In a preferred embodiment, the polymers produced herein are combined with one or more of dispersants, detergents, friction modifiers, traction improving additives, demulsifiers, defoamants, chromophores (dyes), and/or haze inhibitors. These fully formulated lubricants can be used in automotive crank case oil (engine oil), industrial oil, grease, or gas turbine engine oil. These are examples of additives used in finished lubricant formulations. Additional information on additives used in product formulation can be found in "Lubricants and Lubrications", Ed. By T. Mang and W. Dresel, by Wiley-VCH GmbH, Weinheim 2001.

In another embodiment, this invention relates to:

1. A composition comprising the reaction product of

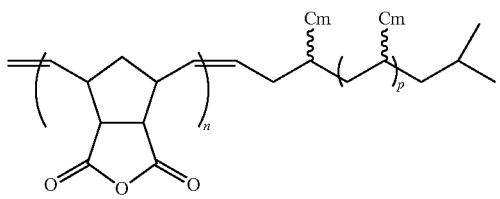

wherein "n" is an integer from 1 to 10,000; each $C_m$ is a $C_1$ to $C_{40}$ olefin derived unit; "m" is an integer from 1 to 39; "p" is an integer greater than 1; and a $C_2$ to a $C_{10}$ carbon cyclic epoxide.

2. The composition of paragraph 1, wherein n is an integer from 1 to 50.

3. The composition of either of paragraphs 1 or 2, wherein $C_m$ is from 4 to 11.

4. The composition of any of paragraphs 1 through 3, wherein p is from 1 to 10,000.

5. The composition of any of paragraphs 1 through 4, wherein the $C_2$ to $C_{10}$ carbon cyclic epoxide is a $C_6$ carbon cyclic epoxide.

6. The composition of any of paragraphs 1 through 5, wherein the Mw of the reaction product is from about 1,000 to about 8,000,000.

7. A composition comprising the formula:

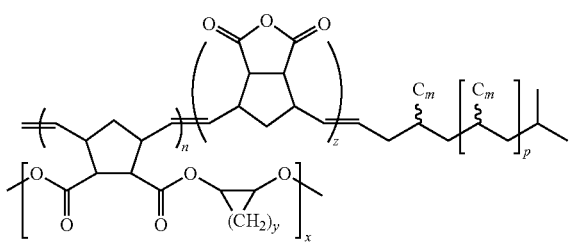

wherein "n" is an integer from 1 to 10,000; "z" is an integer from 0 to 10,000; Cm is a $C_1$ to $C_{40}$ olefin derived unit; "m" is an integer from 1 to 39; "p" is an integer greater than 1; "y" is 0 to 10; and "x" is from 2 to about 1,000,000.

8. The composition of paragraph 7, wherein n is an integer from 1 to 50.

9. The composition of either of paragraphs 7 or 8, wherein $C_m$ is from 4 to 11.

10. The composition of any of paragraphs 7 through 9, wherein p is from 1 to 10,000.

11. The composition of any of paragraphs 7 through 10, wherein y is from 4 to 7.

12. The composition of any of paragraphs 7 through 11, wherein the Mw is from about 1,000 to about 8,000,000.

13. A method to prepare a polyester having the formula:

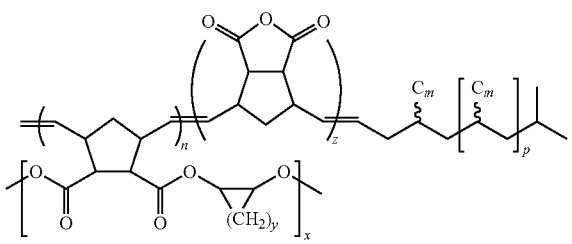

wherein "n" is an integer from 1 to 10,000; "z" is an integer from 0 to 10,000; Cm is a $C_1$ to $C_{40}$ olefin derived unit; "m" is an integer from 1 to 39; "p" is an integer greater than 1; "y" is 0 to 10; and "x" is from 2 to about 1,000,000, comprising the step of:

contacting

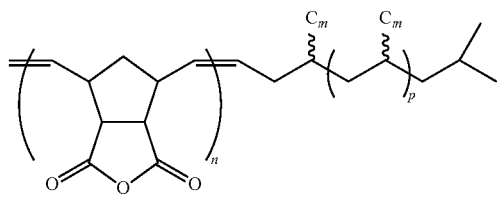

wherein n, m, and p are as described above;

with a $C_2$ to a $C_{10}$ carbon cyclic epoxide, in the presence of a M(III)salen compound, Mg(OEt)$_2$, Zn$_3$[Co(CN)$_6$]$_2$, β-diiminate ZnOAc, or an aluminum porphyrin complex.

14. The method of paragraph 13, wherein the M(III)salen compound is one of:

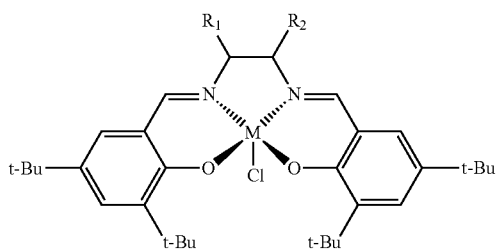

wherein M is Al, Cr or Co;

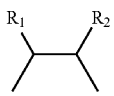

is

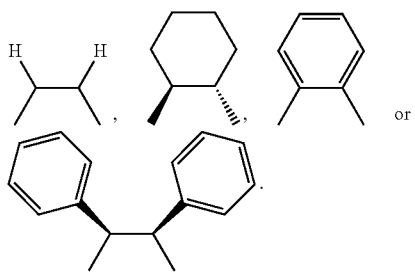

15. The method of paragraph 13, wherein the aluminum porphyrin complex is

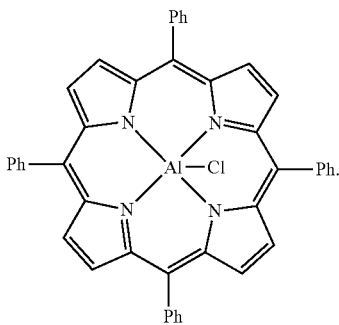

16. The method of paragraph 13, further comprising adding (bistriphenylphosphine)iminium chloride or (4-N,N-dimethylamino-pyridine) and ammonium salts.

17. The method of any of paragraphs 13 through 16, wherein n is an integer from 1 to 50.

18. The method of any of paragraphs 13 through 17, wherein $C_m$ is from 4 to 11.

19. The method of any of paragraphs 13 through 18, wherein p is from 1 to 10,000.

20. The method of any of paragraphs 13 through 19, wherein y is from 4 to 7.

21. The method of any of paragraphs 13 through 20, wherein the Mw is from about 1,000 to about 8,000,000 g/mol.

EXAMPLES

Tests and Materials

The following abbreviations are used in the Examples: h is hours, min is minutes, Me is methyl, and Bu is butyl.

¹H NMR

All 1H NMR data was collected on a Bruker AVANCE III 400 MHz spectrometer running Topspin™ 3.0 software at room temperature (approx 23° C.). Tetrachloroethane-d2 was used as a solvent (chemical shift of 5.98 ppm was used as a reference) for all materials.

Molar Ratio of Products

The molar ratio of products was calculated based on the ratios of the 1H-NMR integration of CH2 olefin in the functionalized polymer (5.1 ppm-5.3 ppm) and the polymer starting material (4.9 ppm-5.0 ppm), plus the CH=CH olefin of the norbornene anhydride starting material (6.3 ppm).

Chromatography-DRI (GPC-DRI)

Mw, Mn and Mw/Mn are determined by using a High Temperature Gel Permeation Chromatography (Polymer Laboratories), equipped with a differential refractive index detector (DRI). Three Polymer Laboratories PLgel 10 µm Mixed-B columns are used. The nominal flow rate is 1.0 mL/min and the nominal injection volume is 300 µL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 µm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. All quantities are measured gravimetrically. The injection concentration is from 0.5 to 2.0 mg/ml, with lower concentrations being used for higher molecular weight samples. Prior to running each sample, the DRI detector is purged. Flow rate in the apparatus is then increased to 1.0 ml/minute and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation.

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ are obtained from published literature. Specifically, a/K=0.695/0.000579 for PE and 0.705/0.0002288 for PP.

The concentration, c, at each point in the chromatogram is calculated from the baseline-subtracted DRI signal, IDRI, using the following equation:

$$c = K_{DRI} I_{DRI}/(dn/dc)$$

where KDRI is a constant determined by calibrating the DRI, and (dn/dc) is the refractive index increment for the system. Specifically, dn/dc=0.109 for both PE and PP.

The mass recovery is calculated from the ratio of the integrated area of the concentration chromatography over elution volume and the injection mass which is equal to the predetermined concentration multiplied by injection loop volume.

All molecular weights are reported in g/mol unless otherwise noted.

Vinyl Terminated Macromonomers

Vinyl terminated macromonomers (also referred to as vinyl terminated copolymers) and the production thereof are described in U.S. Ser. No. 13/072,288; U.S. Ser. No. 13/072,249; U.S. Ser. No. 13/306,263; and U.S. Ser. No. 12/143,663, the contents of which are incorporated herein in their entirety.

Vinyl Terminated Propylene

A vinyl terminated atactic polypropylene having more than 95% vinyl and a Mn of 1600 g/mol was produced according to the procedure in U.S. Pat. No. 8,455,597.

Synthesis of the ROCM Reaction Product of Norbornene Dicarboxylic Anhydride with Vinyl Terminated Propylene Polymer (aPP-anhydride).

The vinyl terminated propylene polymer (1.0 g, described above) was placed in a 20 ml scintillation vial with 5 mls of tetrachloroethane-d2. Cis-5-norbornene-endo-2,3-dicarboxylic anhydride (0.10 g, Sigma Aldrich, St. Louis, Mo.) was added to the mixture. The solubility of the carboxylic anhydride was noted visually as minimal. A 3.0 mg amount of ((t-Bu)2PH)2Cl2Ru=CHCH=C(CH3)2 was added to the reaction mixture and the slurry was heated to 50° C. for three hours. During that time, the insoluble particulates of the carboxylic anhydride were observed to solubilize, thereby providing evidence for the ring opening cross metathesis reaction. The reaction was further diluted into 10 mls of dichloromethane, filtered through 1.0 grams of silica, and dried under vacuum. The product was characterized by 1H NMR: (400 MHz, C2D4Cl2), 5.9 (m), 5.7-5.3 (m), 5.2 (m) 3.5-3.35 (m), 3.25 (br), 3.0 (br), 2.0 (br), 1.57 (br), 1.42 (br), 1.26 (br), 1.02 (br), 0.90 (br), 0.80 (br).

Synthesis of aPP/Cyclohexene Oxide Polyester

A 20.0 gram amount of aPP-anhydride (Mn approximately 2,200 g/mol) produced above was combined with 16 mgs of (1R,2R)-(−)[1,2-Cyclohexanediamino-N,N'bis(3,5-di-t-butyl-salicylidene)]chromium(III) chloride (Aldrich Chemical Co, used as received) and 30 mgs of PPNCl ((bistriphenylphosphine)iminium chloride) in 50 mls of toluene in a 250 ml round bottom flask. The flask was heated to 80° C. under nitrogen. A 1.0 gram amount of cyclohexene oxide was added to the heated solution and the reaction was left overnight. The resulting polymer was isolated by precipitation with methanol. IR vCO 1745 cm-1, Mw 42,100 g/mol, Mn 9000 g/mol, Mz 69,500 g/mol, Mw/Mn 4.62 as determined by 1H NMR.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is not incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A composition comprising the reaction product of

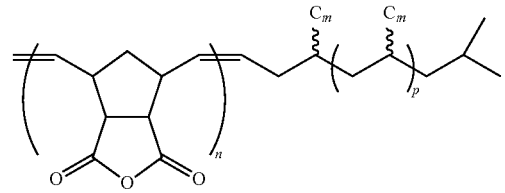

wherein "n" is an integer from 1 to 10,000;
each $C_m$ is a $C_1$ to $C_{40}$ olefin derived unit;
"m" is an integer from 1 to 39;
"p" is 1 or an integer greater than 1; and
a $C_2$ to a $C_{10}$ carbon epoxide.

2. The composition of claim 1, wherein n is an integer from 1 to 50.

3. The composition of claim 1, wherein $C_m$ is a $C_4$ to $C_{11}$ olefin derived unit.

4. The composition of claim 1, wherein p is from 1 to 10,000.

5. The composition of claim 1, wherein the $C_2$ to $C_{10}$ carbon epoxide is a $C_6$ carbon epoxide.

6. The composition of claim 1, wherein the Mw of the reaction product is from about 1,000 to about 8,000,000.

7. The composition of claim 1, wherein p is an integer greater than 1.

8. The composition of claim 1, wherein p is from greater than 1 to 10,000.

9. A composition comprising the formula:

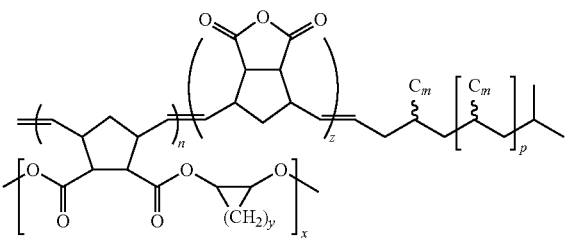

wherein "n" is an integer from 1 to 10,000;
"z" is an integer from 0 to 10,000;
$C_m$ is a $C_1$ to $C_{40}$ olefin derived unit;
"m" is an integer from 1 to 39;
"p" is 1 or an integer greater than 1;
"y" is 0 to 10; and
"x" is from 2 to about 1,000,000.

10. The composition of claim 9, wherein n is an integer from 1 to 50.

11. The composition of claim 9, wherein $C_m$ is a $C_4$ to $C_{11}$ olefin derived unit.

12. The composition of claim 9, wherein p is from 1 to 10,000.

13. The composition of claim 9, wherein y is from 4 to 7.

14. The composition of claim 9, wherein the Mw is from about 1,000 to about 8,000,000.

15. The composition of claim 9, wherein p is an integer greater than 1.

16. The composition of claim 9, wherein p is from greater than 1 to 10,000.

17. A method to prepare a polyester having the formula:

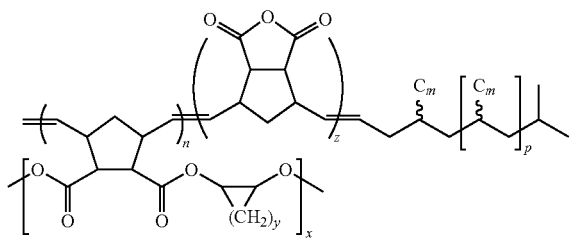

wherein "n" is an integer from 1 to 10,000;
"z" is an integer from 0 to 10,000;
$C_m$ is a $C_1$ to $C_{40}$ olefin derived unit;
"m" is an integer from 1 to 39;
"p" is 1 or an integer greater than 1;
"y" is 0 to 10; and
"x" is from 2 to about 1,000,000, comprising the step of:
contacting

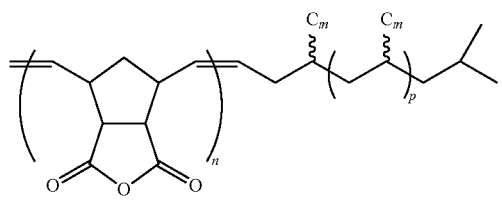

wherein n, m, and p are as described above;
with a $C_2$ to a $C_{10}$ carbon epoxide, in the presence of a M(III)salen compound, $Mg(OEt)_2$, $Zn_3[Co(CN)_6]_2$, β-diiminate ZnOAc, or an aluminum porphyrin complex.

18. The method of claim 17, wherein the M(III)salen compound is one of:

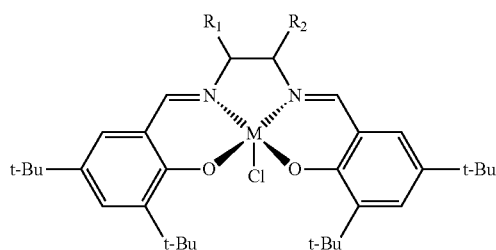

wherein M is Al, Cr or Co;

$\begin{matrix} R_1 & R_2 \\ & \end{matrix}$ is

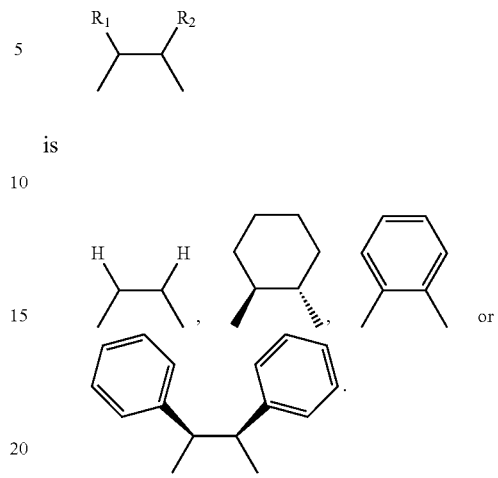

19. The method of claim 17, wherein the aluminum porphyrin complex is

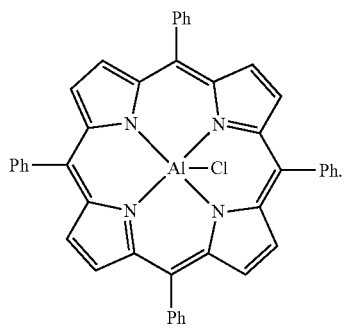

20. The method of claim 17, further comprising adding (bistriphenylphosphine)iminium chloride or (4-N,N-dimethylamino-pyridine) and ammonium salts.

21. The method of claim 17, wherein n is an integer from 1 to 50.

22. The method of claim 17, wherein $C_m$ is from 4 to 11.

23. The method of claim 17, wherein p is from 1 to 10,000.

24. The method of claim 17, wherein y is from 4 to 7.

25. The method of claim 17, wherein the Mw is from about 1,000 to about 8,000,000 g/mol.

26. The method of claim 17, wherein p is an integer greater than 1.

27. The method of claim 17, wherein p is from greater than 1 to 10,000.

* * * * *